United States Patent [19]

DeVincent et al.

[11] 4,035,005

[45] July 12, 1977

[54] QUICK CONNECT COUPLING WITH WEATHER SEAL

[75] Inventors: Patsy DeVincent, Dayton; Robert L. Jones, Bellbrook; Michael P. Rose, Springboro, all of Ohio

[73] Assignee: General Motors Corporation, Detroit, Mich.

[21] Appl. No.: 688,965

[22] Filed: May 24, 1976

[51] Int. Cl.² ............................................ F16L 21/02
[52] U.S. Cl. ............................... 285/319; 285/351; 285/DIG. 25
[58] Field of Search ........... 285/DIG. 25, 351, 319, 285/305, 321, 45, 330

[56] References Cited

U.S. PATENT DOCUMENTS

| | | | |
|---|---|---|---|
| 1,533,886 | 4/1925 | Mueller et al. | 285/330 X |
| 3,089,713 | 5/1963 | Scaramucci | 285/351 X |
| 3,152,815 | 10/1964 | Barragato et al. | 285/319 X |
| 3,453,005 | 7/1969 | Foults | 285/DIG. 25 X |
| 3,603,621 | 9/1971 | Parsons | 285/319 |
| 3,826,523 | 7/1974 | Eschbaugh | 285/DIG. 25 X |
| 3,929,357 | 12/1975 | DeVincent et al. | 285/DIG. 25 X |
| 3,933,378 | 1/1976 | Sandford et al. | 285/DIG. 25 X |

*Primary Examiner*—Thomas F. Callaghan
*Attorney, Agent, or Firm*—Arthur N. Krein

[57] ABSTRACT

A plug member of a quick connect coupling assembly is provided with an annular weather seal abutting against an upset bead on the plug member in position thereon to sealingly engage the free or socket end of a socket member of the coupling assembly when the plug member is fully inserted into locked and sealed engagement with the socket member, the weather seal acting as a barrier to moisture, dirt, dust, etc., penetration into the O-ring seal surfaces of the mating plug and socket members.

3 Claims, 5 Drawing Figures

QUICK CONNECT COUPLING WITH WEATHER SEAL

This invention relates to quick connect type couplings and, in particular, to a quick connect coupling with weather seal.

In various systems, conduits are connected together by suitable couplings, such as quick connect couplings, with fluid under pressure from a source of pressurized fluid, such as a compressor in an air conditioner system, so that even though the compressor may not be in operation, fluid under pressure may still be in the conduits when it is necessary to disconnect them from the source of pressurized fluid. To effect this disconnection of the conduits by means of a coupling, the coupling should be preferably constructed so that it can be partly disconnected so as to permit venting of fluid pressure from the conduits before the coupling is completely disconnected.

In one common form of quick connect couplings used for this purpose, the plug and socket members of such a coupling assembly are normally sealed by an annular seal ring, such as an O-ring, in compressed abutment on opposite sides thereof with external seal surfaces on the plug member and internal seal surfaces on the socket member, when the plug member is in its fully inserted position relative to the socket member. To effect bleed-down of fluid pressure from such assembly prior to the disassembly of the plug member from the socket member, the plug member is first removed a predetermined distance axially in a disassembly direction relative to the socket member whereby to break the seal engagement of the O-ring seal relative to at least one of these members.

To form an effective seal, the O-ring seal in this type quick connect coupling is normally compressed into an annular clearance space provided for this purpose between the outside diameter of the plug member and the inside diameter of the socket member and, this clearance space is thus normally open at one end, the socket end of the socket member, to the atmosphere. Thus, moisture, dirt, dust and other foreign particles present in the atmosphere can enter this annular clearance space to the inner O-ring seal area which could effect rusting or corrosion on the sealing surfaces of either or both the plug member and socket member which then may cause premature failure of the seal to permit the leakage or loss of fluid from this coupling assembly.

Accordingly, it is a primary object of this invention to improve a quick connect coupling whereby a seal mechanism is provided on the coupling which is an effective barrier to moisture, dirt, dust, etc., penetration into the O-ring seal surface of the mating plug and socket members of the coupled joint.

Another object of this invention is to provide an improved quick connect coupling having a weather seal engaging the plug member of such an assembly and positioned to close the normally open end of the socket member of such an assembly when the plug member is fully inserted into the socket member.

A still further object of this invention is to provide an improved quick connect coupling provided with an integral weather seal mechanism operative to effectively minimize moisture, dirt, dust, etc., intrusion into the inner O-ring seal area of such a coupling.

These and other objects of the invention are obtained in a quick connect, readily detachable conduit coupling assembly in which a tubular plug is provided at a pilot plug end thereof with annular spaced apart upset first and second beads thereon, an O-ring seal being positioned to encircle the pilot plug end of the tubular plug outboard of the first or inboard bead thereon in abutment thereagainst, this tubular plug being inserted into a socket member with the O-ring seal in sealing engagement between the socket member and the tubular plug when the tubular plug is in a fully inserted position within the socket member. A weather seal ring, of enlarged outside diameter relative to the O-ring, is positioned to encircle the tubular plug between the first bead and the second bead in abutment against one side of the second bead so that when the tubular plug is fully inserted into the socket member, the free end of the socket member will be in sealing abutment against the weather seal.

For a better understanding of the invention, as well as other objects and further features thereof, reference is had to the following detailed description of the invention to be read in connection with the accompanying drawings, wherein.

Figure 1:
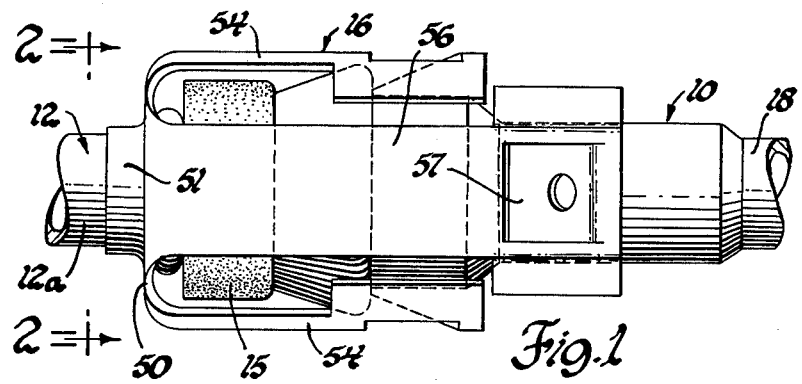
FIG. 1 is a view of a quick connect coupling with weather seal in accordance with the invention, the socket and plug members of this assembly being shown as fully coupled together and locked in this position by the clip of this assembly.

Referring now to the drawings, the quick connect coupling with weather seal of the invention includes as major components thereof an outer female socket member or socket 10, a tubular plug member or male plug 12, a fluid seal ring 14, a weather seal 15 and a retention clip used to releasably secure the socket 10 and plug 12 in assembled relationship to each other, all of these components to be described hereinafter.

The plug 12 is reciprocably received in the socket 10 to couple two fluid conduits together. These conduits may be, for example, tubes, pipes or flexible hoses. The socket 10 may be a separate element with a conduit suitably secured thereto, it may be formed as an integral part of another machine element, such as the inlet or outlet port structure of a refrigerant compressor as an example, or it may be formed, as shown, as an integral part at one end of a tube conduit 18.

Figure 2:
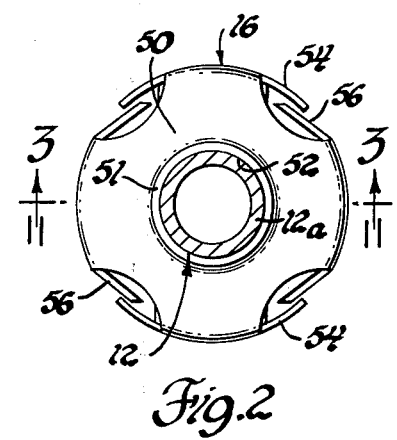
FIG. 2 is a view of the quick connect coupling with weather seal of FIG. 1 taken along line 2—2 of FIG. 1.
Figure 3:
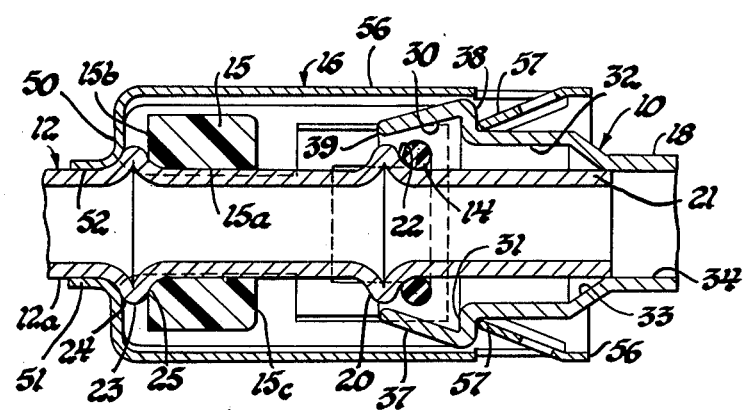
FIG. 3 is a longitudinal sectional view of the quick connect coupling with weather seal assembly of FIG. 1 and taken along line 3—3 of FIG. 2, but showing the plug member thereof in its partly assembled or partly disassembled position relative to the socket member of this assembly.

The plug 12 may also be formed as a separate element with a conduit suitably secured thereto or, as shown, it is formed as an integral part of a conduit. Thus, as shown, the plug 12 is formed at one end of a conduit or tube 12a and includes a first annular bead 20 with a tubular pilot portion 21 extending therefrom to the plug end of the tube, as seen in FIGS. 2 and 3, with the bead 20 thus providing an outward extending radial shoulder 22 facing the pilot portion 21 and it further includes at least a second or retainer bead means or bead 23 which is axially spaced a predetermined distance from the first bead 20 and rearwardly thereof relative to the pilot portion so that this bead is located exteriorly of the socket 10 when the pilot portion 21 of plug 12 is fully inserted into the socket 10 to the position shown in FIG. 4. The beads 20 and 23 may be formed as separate annular rings suitably fixed to encircle the exterior of the plug tube 12a or, as shown, they can be formed as annular upset beads extending radially outward from the main body portion of the plug tube 12a.

As previously described, the socket 10 in the construction shown is a one-piece unit and is of tubular configuration which has been formed integral with and as an enlarged extension at one end of the tube conduit 18 to provide, in effect, a stepped bore therethrough which forms, in succession, starting from the coupling or socket end of the socket, an inner first cylindrical wall 30 that tapers radially outward relative to the open socket end to an intervening annular radial wall 31 joining it to a straight second cylindrical wall 32 which, in turn, is connected by a, preferably, inclined or chamfered radial shoulder or wall 33 to a straight third cylindrical wall 34 of a reduced inside diameter relative to the cylindrical wall 32 and of a size so as to slidably receive the plug end 21 of plug member 12. In the construction illustrated, since the third cylindrical wall 34 is of an inside diameter greater than that of the internal cylindrical wall 35 of the tube conduit 18, it is connected thereto by an annular radial wall 36.

Also in the construction illustrated, the exterior of the socket end of socket 10 is formed complementary to the inner first cylindrical wall 30 and radial wall 31 of the socket to provide a frusto-conical socket end that includes an annular rearwardly rising cam surface 37 terminating at a ridge or radial stop shoulder 38 which extends radially inward from the rise or highest portion of cam surface 37 at a predetermined distance from the end of the socket for a purpose which will become apparent.

The second cylindrical wall 32 of socket 10 is of an inside diameter so as to preferably just slidably receive the annular bead 20 of plug 12 and to provide an annular sealing seat for an annular seal ring 14, such as the O-ring shown, positioned to encircle the pilot tube 21 of the plug 12 in abutment against the shoulder 22 of the bead 20 thereon.

Figure 4:
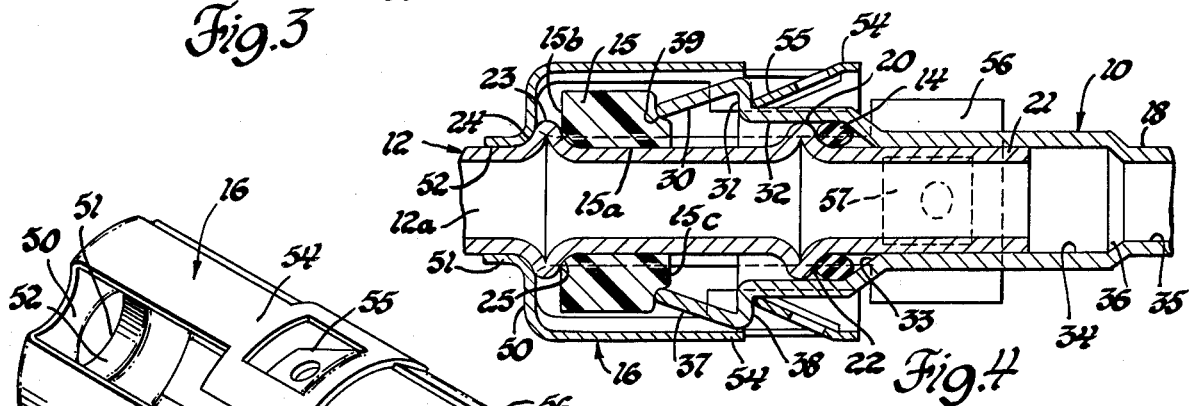
FIG. 4 is a longitudinal sectional view similar to that of FIG. 3 but rotated 90° relative thereto and showing the plug member in its fully inserted position relative to the socket member; and, FIG. 5 is an exploded perspective view of the plug member and clip of the quick connect coupling with weather seal of FIG. 1.
Figure 5:
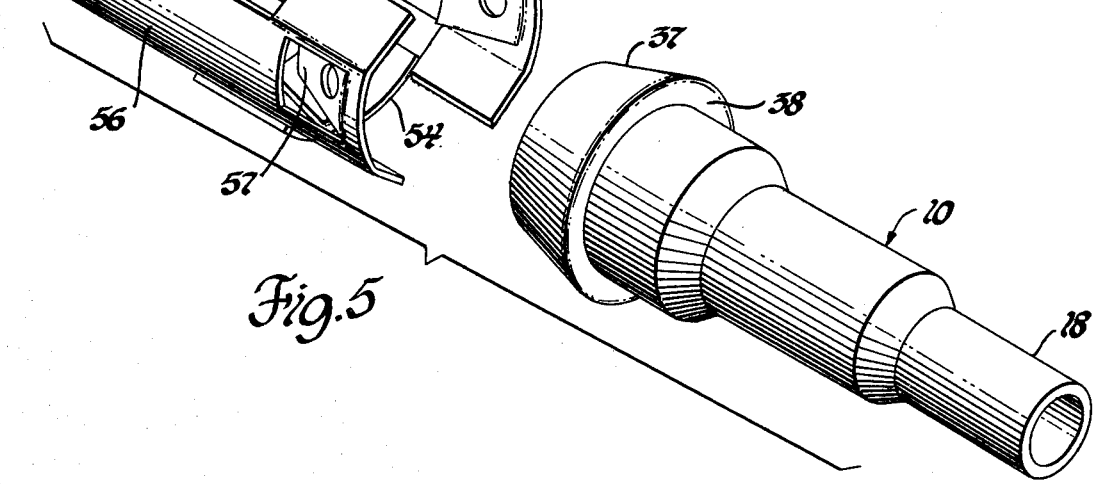

In the fully inserted position of the plug 12 within the socket 10, the position shown in FIG. 4, the cylindrical wall 32 and shoulder 33 of socket 10, together with the outer peripheral surface of pilot portion 21 and radial shoulder 22 of plug 12, form an annular substantially enclosed ring chamber of a predetermined axial width in which the seal O-ring 14 is received, the diameters of the cylindrical wall 32 and of the outer peripheral surface of pilot portion 21 being appropriately selected with respect to each other to effect a predetermined diametrical deformation of the seal O-ring.

The inside diameter of the first cylindrical wall 30 of the socket at the socket end thereof is such so that this end of the socket 10 will freely receive the plug 12 with the O-ring 14 thereon when the O-ring is in its normal uncompressed circular configuration in cross-section, as shown in FIG. 3.

Referring now to the retention clip 16, it is of substantially cup-shaped configuration formed from a suitable material an it includes a disk base 50 having a rearwardly extending collar 51 on one side thereof with a central opening 52 therethrough of a diameter to slidably receive the tube 12a whereby this retention clip 16 may be mounted behind the bead 23 and located thereon so that the disk base 50 is in abutment against one side or shoulder 24 of the bead 23, this shoulder facing in an opposite direction from that of the shoulder 22 of bead 20 so that the enlarged diameter rim, which extends from the disk base 50 in a direction opposite to that of the collar 51, will extend longitudinally out over the plug portion of plug 12 to encircle this plug a predetermined distance radially outward therefrom.

The rim of the retention clip 16 is suitably, longitudinally pierced so as to provide a plurality of circumferentially spaced apart axial extending flexible spring fingers or detent legs, including a set of at least two short or "lock" detent legs 54, each of which has at least one radially inward extending stop or lock tang 55 thereon and a set of at least two long or "blow down" detent legs 56, each having at least one radially inward extending stop tang 57. The tangs 55 and 57 in the construction illustrated are provided by piercing and then bending over portions of the detent legs 54 and 56, respectively. In addition, in the construction illustrated, the detent legs 54 and 56 are circumferentially equally spaced apart with the detent legs 54 diametrically opposite each other as are the detent legs 56.

The terms short and long, as used with reference to detent legs 54 and 56, respectively, do not necessarily refer to the actual length of these detent legs, but rather to the axial spacing of the tangs 55 and 57 of the respective detent legs 54 and 56, relative to the disk 50, even though, in the construction shown, the detent legs 56 are actually physically longer than the detent legs 54.

The rim of the retention clip 16 is of a nominal diameter, that is, the distance between the detent legs in a set of detent legs, is such that the main body portion of the detent legs 54 and 56 will telescopically receive the socket 10, with these detent legs in their normal parallel position to the centerline or axis or the plug 12, the tangs 55 and 57 of these legs, of course, will extend radially inward a predetermined distance from the main body of the respective detent legs 54 and 56 so as to be engageable with the ridge or stop shoulder 38 of the socket.

During assembly of the plug 12 into socket 10, the plug 12 with the O-ring 14 thereon is inserted axially into the socket 10 and then with axial pressure applied against the retainer clip 16, in a direction toward the socket 10, the tangs 57 of the long detent legs 56 will be caused to slide over the cam surface 37 causing these detent legs 56 to spring radially outward and then causing the tangs 55 of the short detent legs 54 to also slide over the cam surface 37 also springing these detent legs 54 radially outward. However, as the tangs 55 drop off the rise of cam surface 37, the detent legs 54 will flex back to their normal position so that the tangs 55 will then be positioned to engage the stop shoulder 38 to thereby effect locking of the plug 12 in a fully inserted position within the socket 10 and thus in sealing relation thereto. This is the fully coupled and locked position of these elements shown in FIGS. 1 and 4. In this position, the tangs 57 on the long detent legs 56 are axially spaced rearwardly from the shoulder 38 of the socket.

To disconnect the plug 12 from socket 10, the short detent legs 54 of the retention clip 16 are manually deflected radially outward to release the tangs 55 from shoulder 38 thus permitting axial separation of plug 12 relative to socket 10 until the tangs 57 on the long or "blow down" detent legs 56 engage the shoulder 38. In this axial position of the plug 12 relative to socket 10, the O-ring 14 has been permitted to be withdrawn out of engagement with the cylindrical wall 32 into at least the enlarged bore portion defined by cylindrical wall 30 thus permitting blow down, around the outer periphery of the O-ring 14, of any fluid pressure from the conduits. This "blow down" position of plug 12 relative to socket 10 is shown in FIG. 3. After pressure blow down, the detent legs 56 can then be deflected radially outward to release the tangs 57 from shoulder 38 to thereby permit complete axial withdrawal of plug 12 from socket 10.

The weather seal 15 in the form of an annulus or ring composed of a suitable soft, non-porous, resilient material, such as expanded neoprene rubber, that will readily conform to exterior loads, but will also compress locally and, therefore, any stressed surface thereof will remain in contact with the element causing the local compression. As best seen in FIGS. 1, 3 and 4, the weather seal is provided with a suitable inside annular peripheral wall 15a of a diameter so that this weather seal can be positioned to encircle the tube 12a in between the beads 20 and 23 thereon and it is axially positioned on this tube so that one side, side 15b thereof, will abut against a shoulder 25 provided by the bead 23 on the side thereof so that this shoulder 25 faces in the same direction as the shoulder 22 of bead 20, that is, the shoulder 25 faces toward the tubular pilot portion 21 of plug 12.

The inner peripheral surface of the wall 15a of the weather seal is sufficiently pliable and soft enough so that the material thereof can be contorted and expanded as it is assembled over either bead 20 or bead 23 onto the tube 12a, but this material should be resilient enough so that its configuration is restored after this weather seal is in an assembled position, the position shown in the above identified figures, so that the surface of annular wall 15a will maintain as positive interference or sealing fit with the outer peripheral surface of the tube 12a.

The outside diameter of the weather seal and its axial or longitudinal length between its end or sides 15b and 15c is selected so that, when the plug 12 is in its fully inserted or sealed position relative to the socket 10, the weather seal is loosely encircled by the retention clip 16 and the annular socket end surface 39 of the socket 10 will abut against the side 15c and axially compress the weather seal 15 so as to sealingly close off the otherwise open socket end of the socket 10 whereby to provide an effective barrier to moisture, dirt, dust, etc., penetration into the sealing surfaces, previously described, which cooperate with the seal O-ring 14 to effect sealing between the mating female and male portions of the coupling in their coupled and sealed relationship relative to each other. The axial length of the weather seal 15 will of course depend on the axial spacing of the shoulder 25 relative to other elements of the coupling assembly to obtain the desired axial compression of this seal.

It will be apparent that, in the construction of the quick connect coupling with weather seal described and illustrated, the weather seal 15 will not interfere with the normal assembly of the coupling and it would not interfere with field servicing, if necessary, of such a coupling. It will also be apparent that the weather seal 15 can also be used with other type quick connect coupling assemblies, for example, this type weather seal 15 could readily be used on a quick connect coupling as shown in U.S. Pat. No. 3,929,357 issued Dec. 30, 1975 to Patsy DeVincent and John F. Wiechart entitled "Quick Connect Coupling with Tandem Snap Rings."

What is claimed is:

1. A quick connect coupling comprising a tubular plug member including a tube having axially spaced apart first annular bead means and second annular bead means, said first annular bead means providing a first shoulder on said tube with a cylindrical pilot portion means extending from said first shoulder to a free end of said tube and a seal ring encircling said pilot portion in abutment against said first shoulder, said second annular bead means providing on opposite sides thereof a second shoulder and a third shoulder, said third shoulder facing in the same direction as said first shoulder, an annular weather seal of enlarged outside diameter encircling said tube in sealing engagement therewith between said first and second annular bead means in abutment against said third shoulder, a tubular socket member having a stepped cylindrical therethrough and defining a socket with internal annular cylindrical walls including a first wall adjacent the open end thereof of an internal diameter to loosely receive said bead means, a second wall of a smaller diameter than said first wall so as to slidably receive said first bead means, said second wall being connected to said first wall by an annular radial wall, and a third wall of still further reduced diameter to slidably receive said pilot portion, said socket member having an annular radial flange on the exterior thereof providing a ramped forward surface connected at one end by an annular end wall to said first wall and terminating at its other end at a radial shoulder, said tubular plug member being slidably received in said socket member to be in sealing relation to said socket when in a fully inserted position therein and, an outer retainer means connected to said tubular plug member for abutment against said second shoulder and positioned to extend over said socket member when said tubular plug member is inserted therein, said outer retainer means including a first detent leg means of an axial length to be engageable with said radial shoulder when said tubular plug member is in said fully inserted position in said socket member and a second detent leg means of a length to be engageable with said radial shoulder to retain said tubular plug member within said socket in non-sealing, non-fully inserted position relative thereto, said end wall of said socket being axially pressed into abutment against said weather seal when said tubular plug member is in said fully inserted position in said socket whereby said weather seal sealingly closes said open end of said socket.

2. A quick connect coupling with weather seal comprising a tubular socket member having a stepped cylindrical opening therethough and defining at one end thereof a socket, said cylindrical opening providing a first annular wall extending from said one to terminate at an inward extending radial wall, a second annular wall extending from said radial wall and terminating at an inward extending second radial wall and a third annular wall extending from said second radial wall, said socket member having an annular flange on the exterior thereof defining a retainer shoulder axially spaced from said one end, a tubular plug member having a plug portion at one end thereof of a diameter to be slidably received in a portion of said stepped cylindrical opening defined by said third annular wall, said tubular plug member further having a first annular bead next adjacent said plug portion providing a first shoulder facing said plug portion and at least one other annular bead means spaced axially from said first annular bead providing a second shoulder and a third shoulder on opposite sides thereof with said third shoulder facing in the same direction as said first shoulder, an annular ring seal encircling said plug portion and retained against axial movement in one direction thereon by said first shoulder, said first shoulder of said annular bead forming with said second radial wall and said second annular wall and with the outer periphery of said plug portion a substantially enclosed chamber for said annular ring seal when said tubular plug member is in a fully inserted position in said socket member, a second annular weather seal of predetermined outside diameter and axial length sealingly encircling said tubular plug member in abutment against said third shoulder of said bead means and, an outer cup-shaped retainer means operatively encircling said tubular plug member for abutment against said second shoulder to limit axial movement of said retainer means relative to said tubular plug member in one direction, said outer cup-shaped retainer means including a first detent leg means extending over said plug portion and engageable with said retainer shoulder when said plug portion is in said fully inserted position in said socket member to hold said plug member fully engaged in said socket member with said annular ring seal then in sealing engagement with said second annular wall and to position said second annular weather seal in sealing engagement against said one end of said socket member and, a second detent leg means extending over said plug portion and engageable with said retainer shoulder to retain said plug portion within said socket member in an axial position relative thereto at which said annular ring seal is out of sealing engagement with said second annular wall and second annular weather seal is out of sealing engagement with said one end of said socket member.

3. A fluid conduit coupling comprising in combination an outer tubular member having a stepped bore therethrough and defining a socket with a socket end at one end thereof, a tubular plug member slidably received in said socket to be in sealing relation to said socket when in a fully inserted position therein and to be in non-sealing relation with said socket when in a partly inserted position therein, said stepped bore in said socket defining in series a first cylindrical wall, a second cylindrical wall of smaller internal diameter than said cylindrical wall with an intervening radial shoulder therebetween and a third cylindrical wall of an internal diameter smaller than said second cylindrical wall with a second radial shoulder therebetween, said first cylindrical wall extending to said coupling end, said socket adjacent to said socket end having a conical ridge on the exterior thereof providing a rising cam surface terminating at a radial stop shoulder, said plug member having a pilot portion at one end thereof of a diameter to be slidably received into the bore as defined by said third cylindrical wall, said plug member further having a first annular bead and a second annular bead axially spaced from said first annular bead, said first annular bead providing a first shoulder from which said pilot portion extends, an annular seal ring encircling said pilot portion to engage said first shoulder in position to engage with said second cylindrical wall, said first shoulder defining with said second cylindrical wall, said second radial shoulder and the exterior of said pilot portion, an annular seal ring cavity for said seal ring with said first annular bead slidably received in said second cylindrical wall, said second annular bead defining a rearwardly facing retainer shoulder and a forwardly facing shoulder on opposite sides thereof, a retainer clip slidably encircling said plug member, said retainer clip including a centrally apertured disk positioned to encircle said plug member in abutment against said rearwardly facing retainer shoulder, said disk having a first set of short spring fingers with locking tangs thereon extending therefrom substantially parallel to the axis of said plug member and a set of circumferentially spaced apart long spring legs with locking tabs thereon extending outward from said disk parallel to the axis of said plug member, said tangs of said short spring legs being adapted to engage said stop shoulder when said plug member is in said fully inserted position in said socket to retain said plug member therein, said tangs on said long spring legs being axially spaced from said tangs on said short legs and positioned to engage said stop shoulder during initial disassembly of the plug member of said socket to permit axial movement of said plug member relative to said socket to said partly inserted position whereby said seal ring is moved into the bore defined by said first cylindrical wall and, an annular weather seal ring sealingly encircling said plug member between said first annular bead and said second annular bead in abutment against said forwardly facing shoulder to sealingly engage said socket end of said tubular member when said plug member is in said fully inserted position in said socket.

* * * * *

UNITED STATES PATENT AND TRADEMARK OFFICE
CERTIFICATE OF CORRECTION

PATENT NO. : 4,035,005

DATED : July 12, 1977

INVENTOR(S) : Patsy DeVincent et al

It is certified that error appears in the above-identified patent and that said Letters Patent are hereby corrected as shown below:

Column 2, line 47 "retention clip used" should read --retention clip 16 used --.

Column 3, line 67 "suitable material an it" should read -- suitable material and it --.

Column 4, line 41 "axis or the" should read -- axis of the --.

Column 5, line 42 "maintain as positive" should read -- maintain a positive --.

Column 6, line 15 "portion means extending" should read -- portion extending --; line 25 "cylindrical therethrough" should read -- cylindrical opening therethrough --; line 62 "one to terminate" should read -- one end to terminate --.

Column 8, line 2 "than said cylindrical" should read -- than said first cylindrical --.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks